Feb. 10, 1931.   F. H. SIEFKEN   1,792,045
SCOOTER
Filed Sept. 14, 1929   2 Sheets-Sheet 2

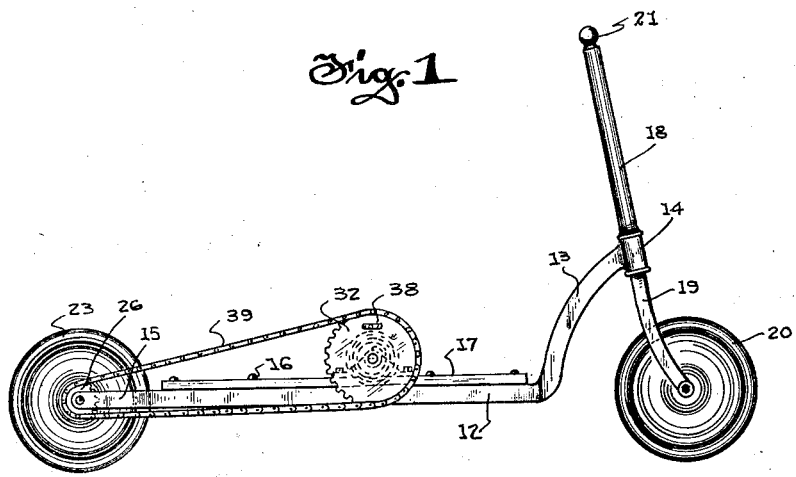

INVENTOR.
Frank H. Siefken
BY
Morsell, Keeney, & Morsell
ATTORNEYS.

Patented Feb. 10, 1931

1,792,045

UNITED STATES PATENT OFFICE

FRANK H. SIEFKEN, OF MILWAUKEE, WISCONSIN

SCOOTER

Application filed September 14, 1929. Serial No. 392,642.

This invention relates to improvements in scooters.

It is one of the objects of this invention to provide a scooter having an improved driving means which is adapted to facilitate operation of the device and to increase the speed which may be attained.

A further object of this invention is to provide an improved scooter which is simple in construction, efficient in operation and well adapted for the purpose described.

With the above and other objects in view the invention consists of the improved scooter and all its parts and combinations as set forth in the claims, and all equivalents thereof.

In the accompanying drawings in which the same reference numerals designate the same parts in all of the views:

Fig. 1 is a side elevational view;

Fig. 2 is a plan view;

Fig. 3 is an enlarged detail view showing the driving connections, parts being broken away;

Fig. 4 is a sectional view taken on line 4—4 of Fig. 3;

Fig. 5 is a sectional view taken on line 5—5 of Fig. 4;

Fig. 6 is a sectional view taken on line 6—6 of Fig. 3;

Figure 7:
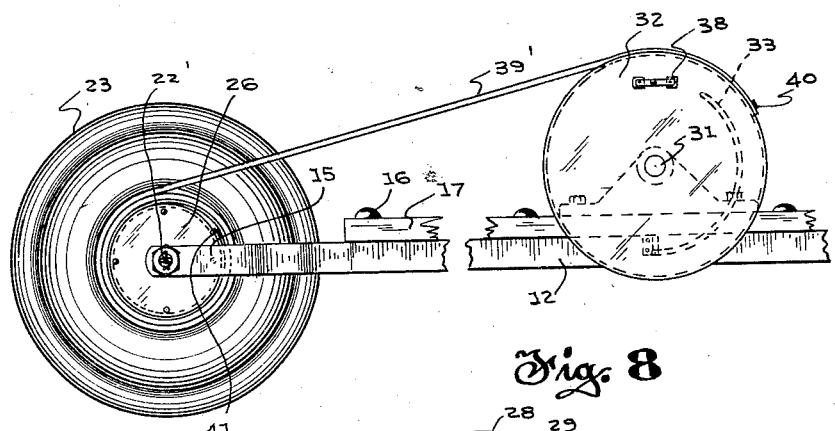
Fig. 7 is a view similar to Fig. 3 showing a modified form of driving means.
Figure 8:
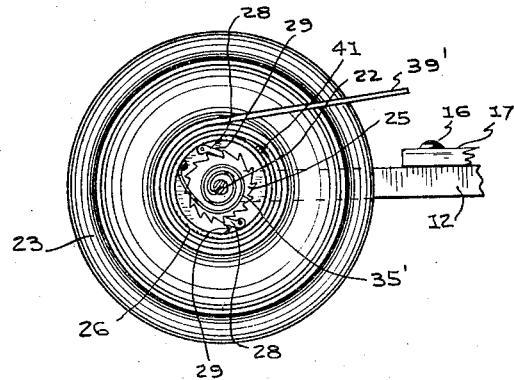
Fig. 8 is a view showing the rear wheel of the modified form illustrated in Fig. 7, the cover of the sprocket wheel housing being removed.

Referring to the drawings, the numeral 12 designates the frame of the device, said frame having an upwardly curved front portion 13 formed with a bearing 14 and having a forked rear portion 15. Secured to the top of the frame by bolts 16 is a narrow elongated platform 17.

A front steering post 18 is mounted in the bearing 14. Said post is formed with a forked lower portion 19 within which a front wheel 20 is rotatably carried, and with an upper handle bar 21.

A short axle 22 is mounted within the forked rear frame portion 15. The said rear axle has squared end portions 22' which fit within square openings of the frame members to prevent rotation of the axle in the frame. A rear wheel 23 is loosely mounted on said axle and said rear wheel is provided with a hub portion 24 to which a ratchet wheel 25 is rigidly secured (see Fig. 4).

A circular housing 26 is loosely mounted on the hub 24 and is rotatable therearound. The said housing is formed on its outer periphery with sprocket teeth 27. Within the housing are dogs 28 which engage the ratchet wheel 25. Springs 29 each have one end secured to the side of the housing and have the other end engaging the adjacent dog to hold the latter in engaging position.

On an intermediate portion of the platform 17 and at one side thereof a bearing bracket 30 is mounted. A pin 31 is journaled in said bearing and loosely mounted on the outer end thereof is a sprocket wheel 32. The inner side of said sprocket wheel is formed with a groove 33. A lug 34 which extends outwardly from the side of the frame engages said groove. A coiled spring 35 has one end secured to the sprocket wheel as at 36 and has its other end secured to the bearing 30. A pedal 38 is pivoted to an eccentric portion of the outer side of the sprocket wheel. The sprocket wheel 32 is connected to the rear sprocket teeth 27 by means of an endless chain 39.

In operation of the principal form, a child places one foot upon the platform 17 and the other foot on the pedal 38. Upon pushing downwardly, the sprocket wheel 32 is rotated, and through the endless chain 39 the rear housing 26 is rotated. Through the dogs 28 which engage the ratchet wheel, 25 motion is transmitted to the rear wheel 23. The pedal 38 may be pushed downwardly until the lug 34 engages the upper end of the groove 33. At this point pressure of the foot is released and the spring, which has been wound up upon downward movement of the pedal, will now return the sprocket wheel 32 to its original position. This will have no effect upon the rear wheel of the scooter as the dogs 28 will merely slip over the teeth of the ratchet wheel without causing rotation thereof. The pedal may then be pushed downwardly again to continue the forward movement of the vehicle.

In Fig. 7 a modification is shown which is quite similar to the principal form. In this modification, however, instead of the chain 39 a belt 39' is employed, the said belt having one end secured to the front wheel as at 40 and having its other end wound around the housing 26 and secured thereto as at 41, the said housing thereby serving as a drum. Within the housing, in addition to the ratchet 25 and dogs 28, there is a coiled spring 35' which has one end secured to the axle and its other end to the housing. The operation of this modified form is similar to that of the principal form except that pressure upon the pedal causes unwinding of the belt 39'. When the pressure of the foot upon the pedal is released the coiled spring 35' will cause the drum 26 to return to its original position and to wind the belt thereon ready for another downward stroke upon the pedal. It is to be noted that in this form, as the belt unwinds from the rear drum the circumference of the drum plus the belt wound thereon decreases, giving a greater gear ratio and thereby increasing the speed.

Figure 9:
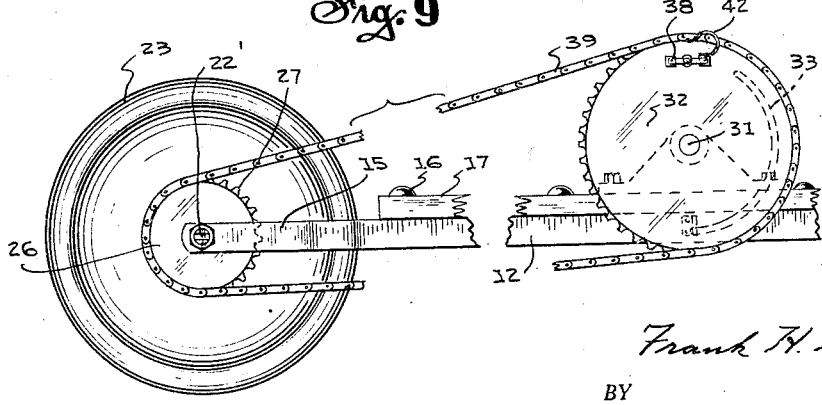
Fig. 9 is a view similar to Fig. 3 showing an additional modification.

In the modification disclosed in Fig. 9 the construction is indentical with the principal form except that there is no spring in connection with either the front sprocket wheel or the rear sprocket wheel. Instead, a toe clip 42 has been provided and in operation, inasmuch as there is no spring, it is necessary to pull upwardly as well as to push downwardly.

It is to be understood that the term "belt" as used in the claims covers either a chain belt as shown in the principal form or the ordinary type of belt as shown in one of the modifications.

From the foregoing description it may be seen that the improved scooter is simple in operation and well adapted for the purpose described.

What I claim is:

1. A scooter comprising a frame, front and rear wheels rotatably carried by said frame, an operating wheel rotatably mounted on said frame, a pedal for rotating said operating wheel, a rotatable drum adjacent said rear wheel, belt means having one end rigidly connected to said operating wheel and having its other end rigidly connected with said drum and windable thereon in several strata, and means between said drum and said rear wheel for rotating the latter only when said drum is rotated in a forward direction by the operating wheel, the speed of the rear wheel increasing as the strata of the belt are unwound from the drum.

2. A scooter comprising a frame, front and rear wheels rotatably carried by said frame, an operating wheel rotatably mounted on said frame and adapted to be reciprocally moved during operation of the device, a rotatable drum adjacent said rear wheel, endless belt means connecting said operating wheel with said drum, means between said drum and said rear wheel for rotating the latter only when said drum is rotated in a forward direction by the operating wheel, and a pedal in connection with said operating wheel having means for engagement both above and below the toe of the user to provide for foot operation of the operating wheel in two directions.

3. A scooter comprising a frame, front and rear wheels rotatably carried by said frame, an operating wheel rotatably mounted on said frame and adapted to be reciprocally moved during operation of the device, said operating wheel having an arcuate groove less than a semi-circle in length on one side thereof, a rotatable drum adjacent said rear wheel, belt means connecting said operating wheel with said drum, means between said drum and said rear wheel for rotating the latter only when said drum is rotated in a forward direction by the operating wheel, and a lug projecting from the frame and engageable with the groove in the operating wheel for limiting the movement of the latter.

4. A scooter comprising a frame, front and rear wheels rotatably carried by said frame, an operating wheel rotatably mounted on said frame and adapted to be reciprocally moved during operation of the device, said operating wheel having an arcuate groove on one side thereof, a rotatable drum adjacent said rear wheel, belt means connecting said operating wheel with said drum, means between said drum and said rear wheel for rotating the latter only when said drum is rotated in a forward direction by the operating wheel, and a lug projecting from the frame and engageable with the groove in the operating wheel for limiting the movement of the latter.

In testimony whereof I affix my signature.

FRANK H. SIEFKEN.